Feb. 28, 1928.
A. O. JAEGER
1,660,511
CATALYTIC APPARATUS
Filed Jan.19, 1927      11 Sheets-Sheet 1
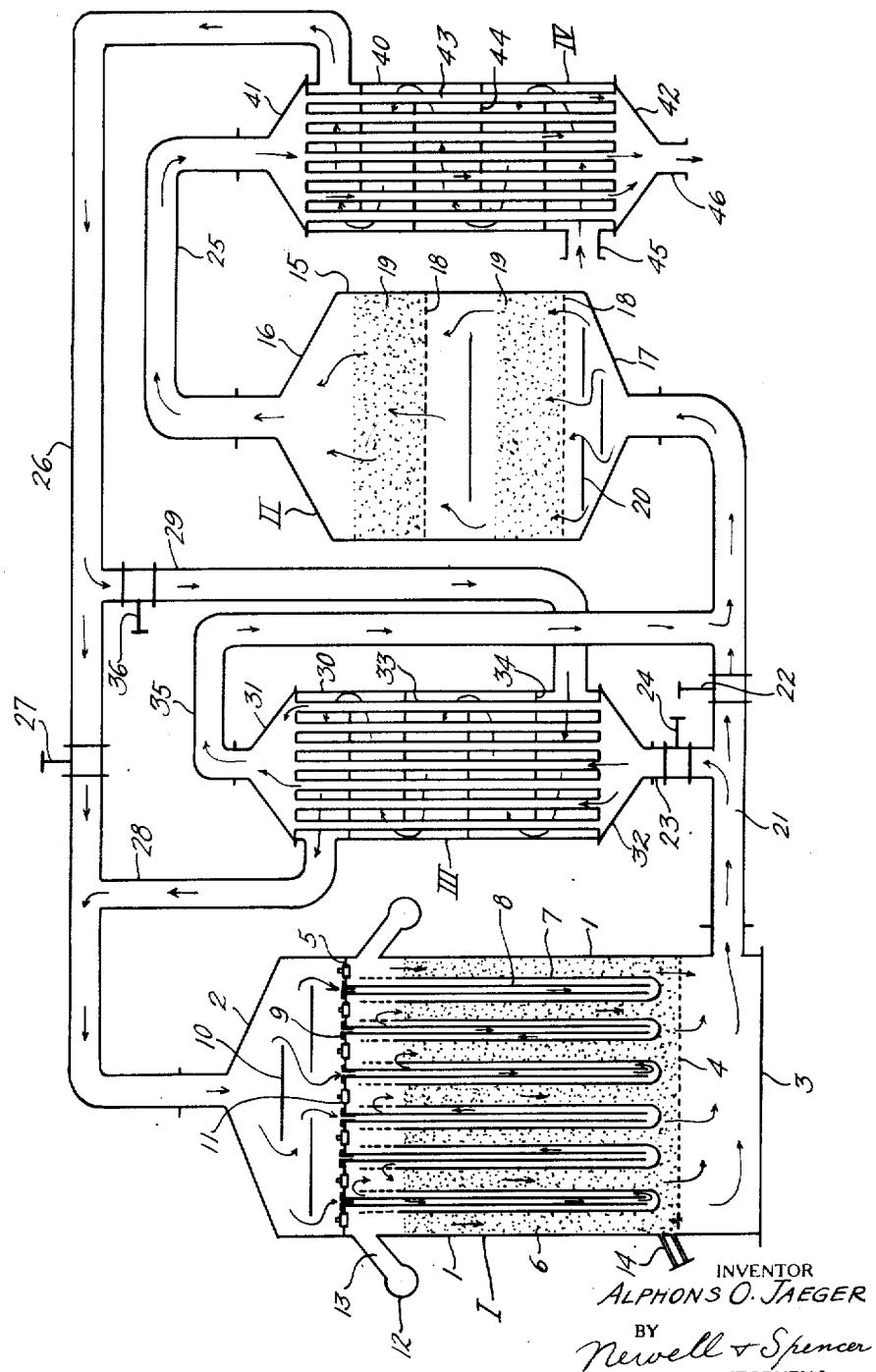
INVENTOR
ALPHONS O. JAEGER
BY
Newell & Spencer
ATTORNEYS

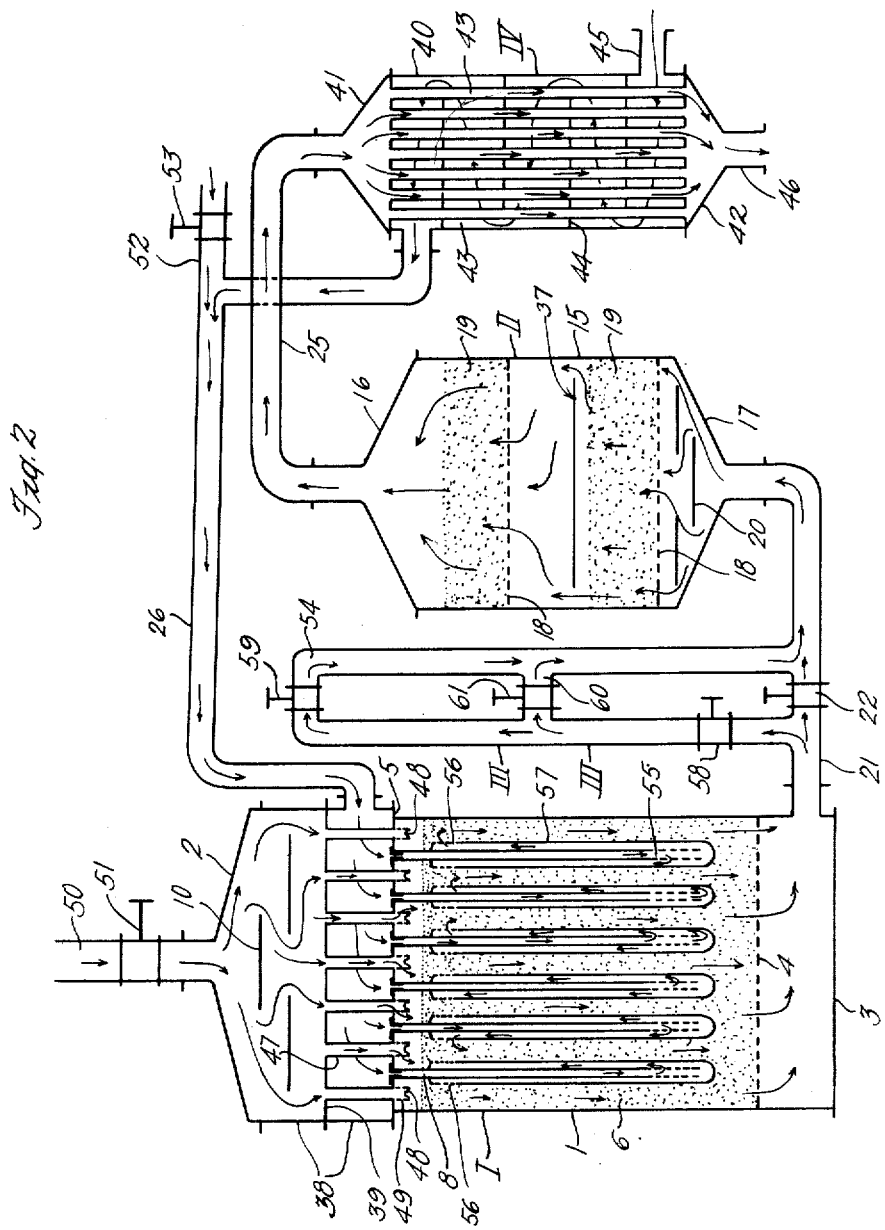

Feb. 28, 1928.
A. O. JAEGER
1,660,511
CATALYTIC APPARATUS
Filed Jan. 19, 1927
11 Sheets-Sheet 3
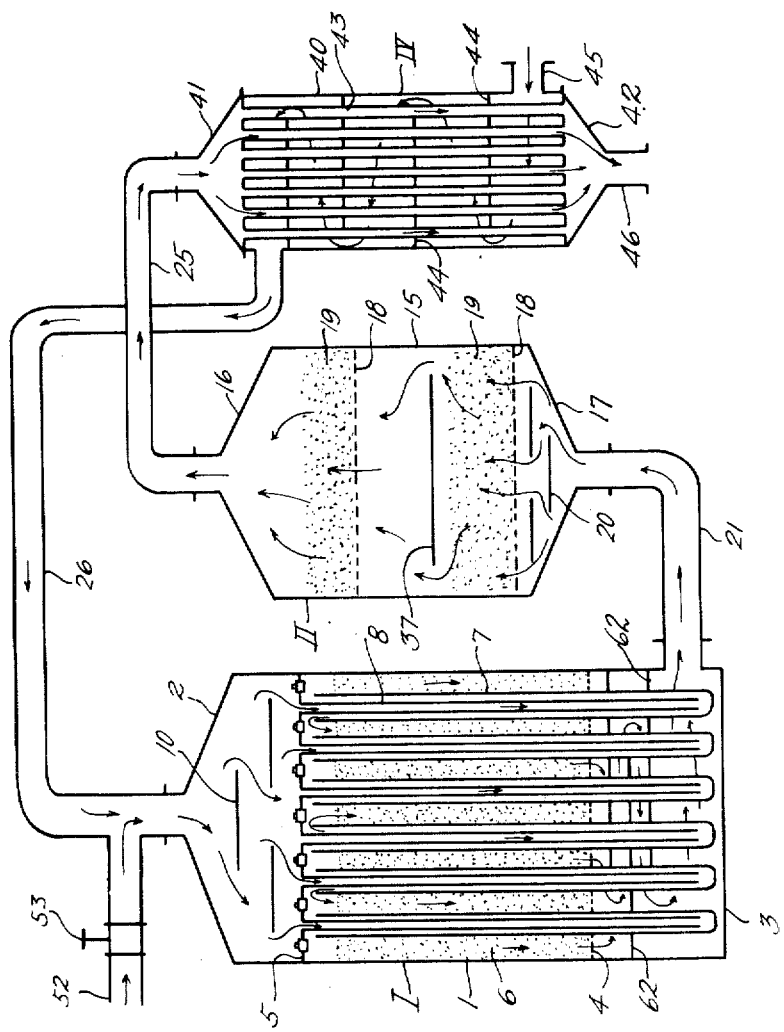
INVENTOR
ALPHONS O. JAEGER
BY
Newell + Spencer
ATTORNEYS

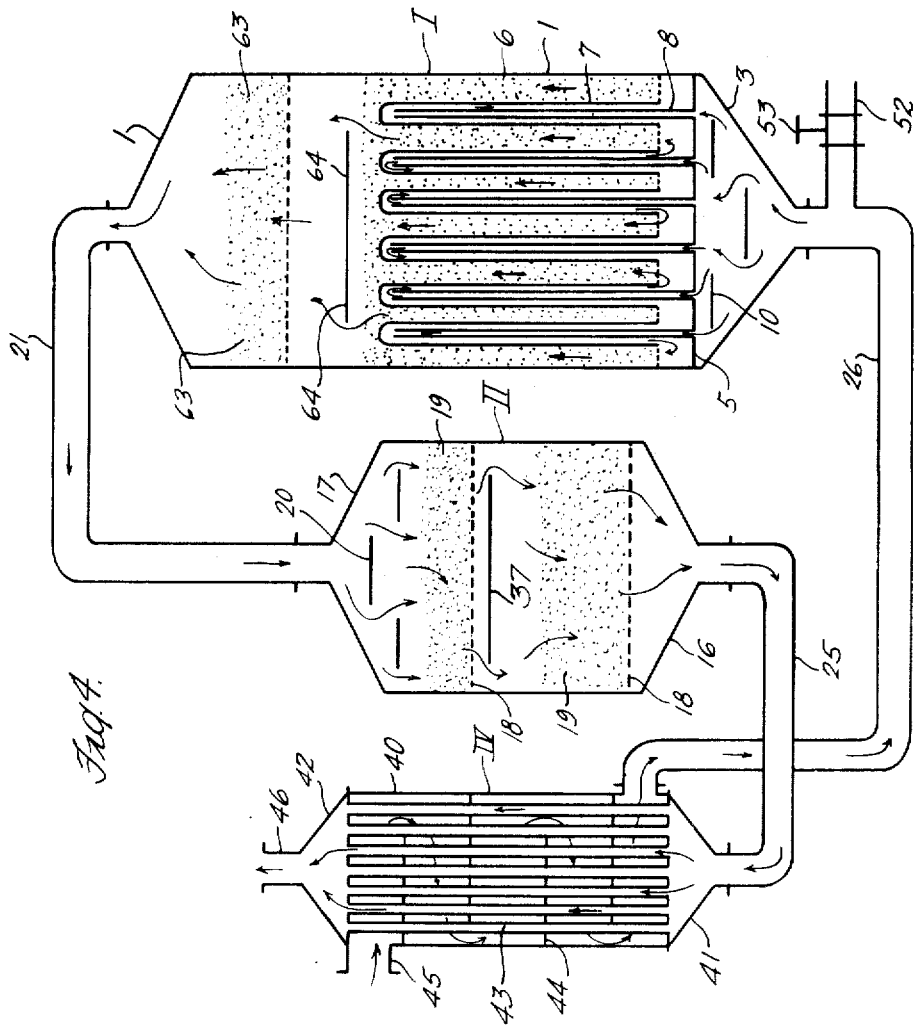

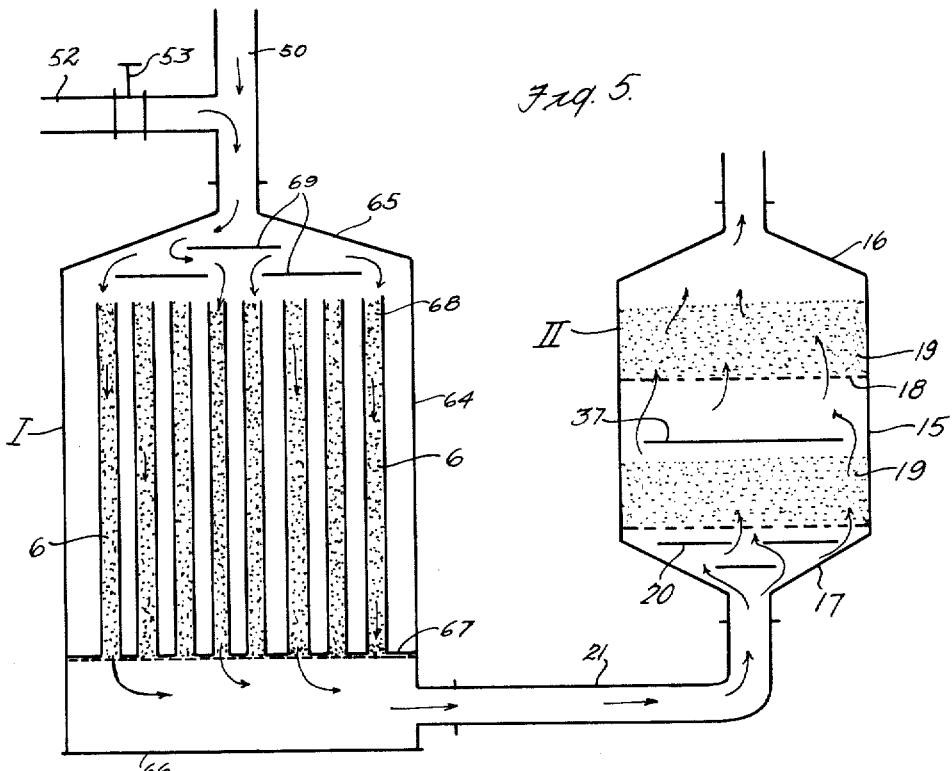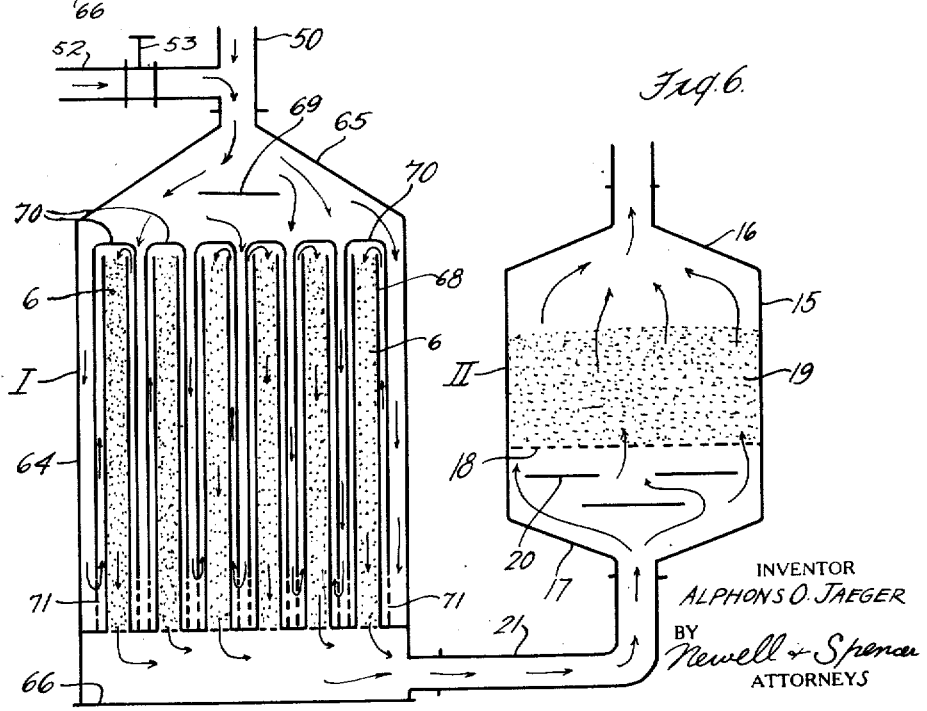

Feb. 28, 1928.
A. O. JAEGER
1,660,511
CATALYTIC APPARATUS
Filed Jan. 19, 1927  11 Sheets-Sheet 6
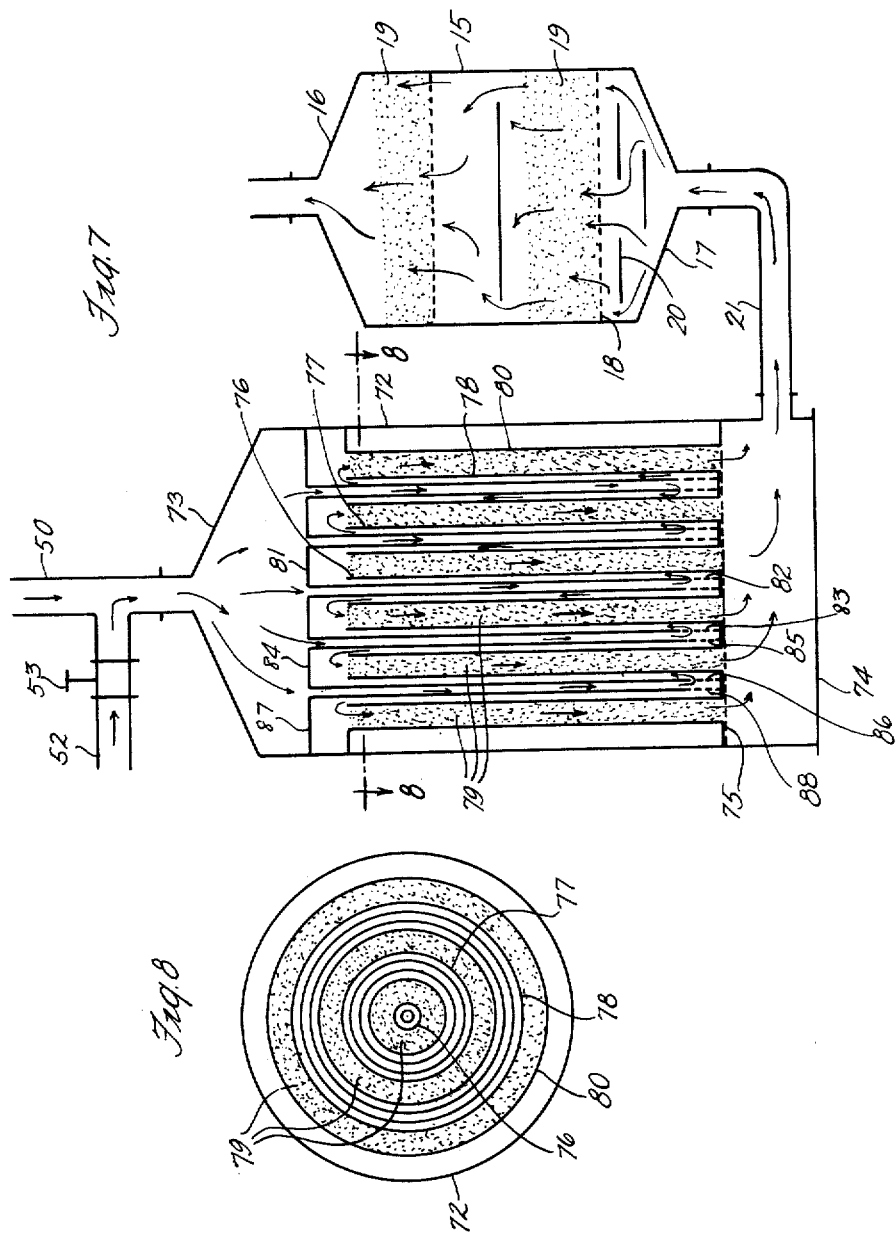
INVENTOR
ALPHONS O. JAEGER
BY
Newell + Spencer
ATTORNEYS Feb. 28, 1928.
A. O. JAEGER
1,660,511
CATALYTIC APPARATUS
Filed Jan. 19, 1927    11 Sheets-Sheet 7
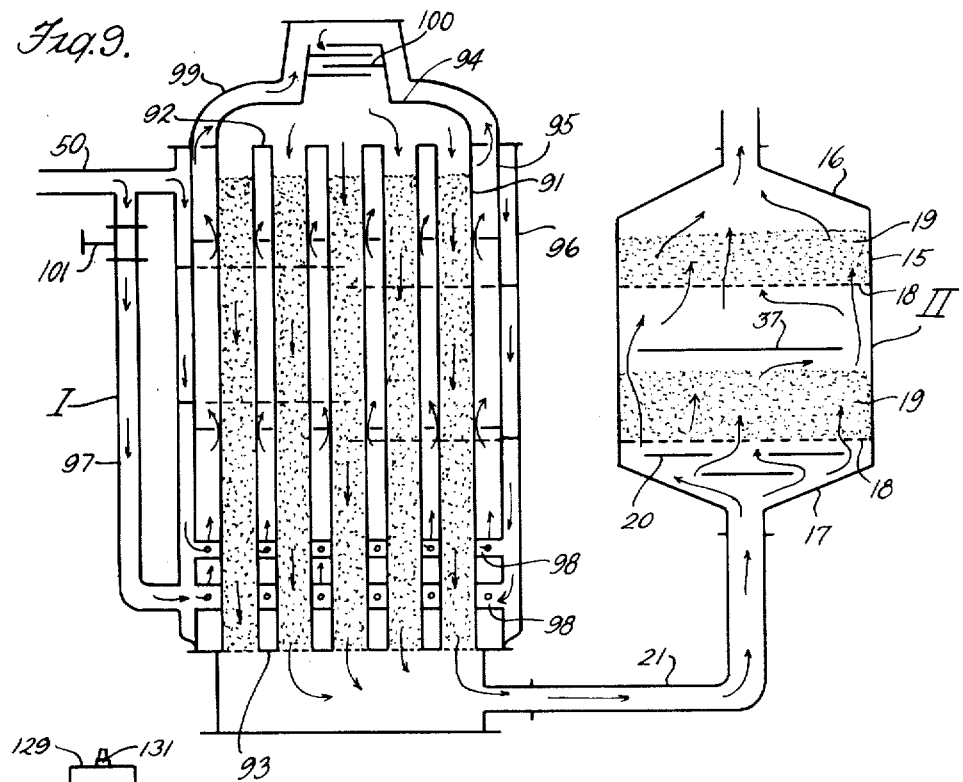
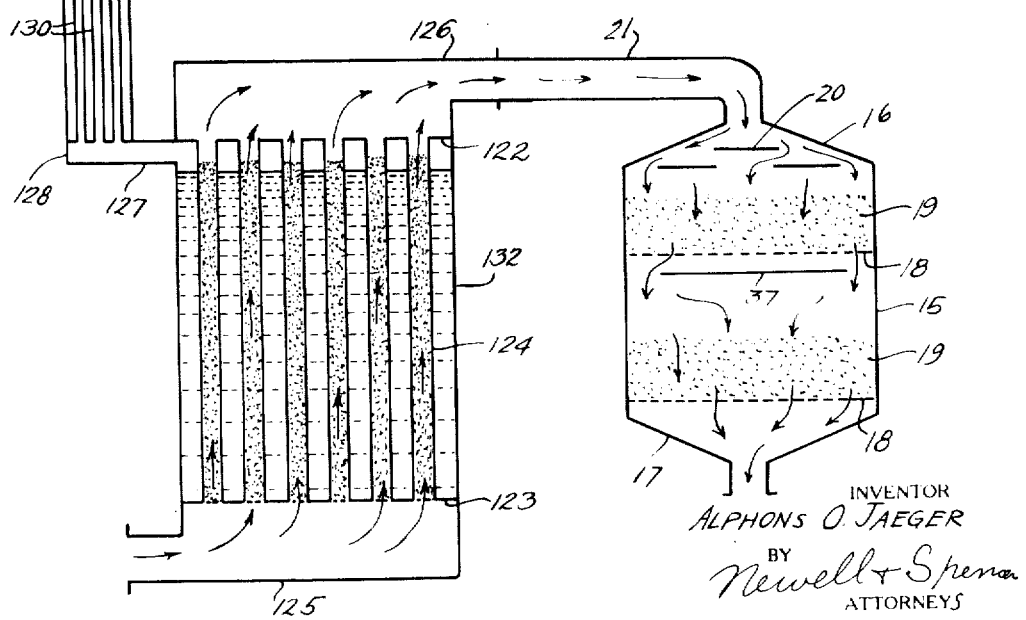
INVENTOR
ALPHONS O. JAEGER
BY Newell & Spena
ATTORNEYS

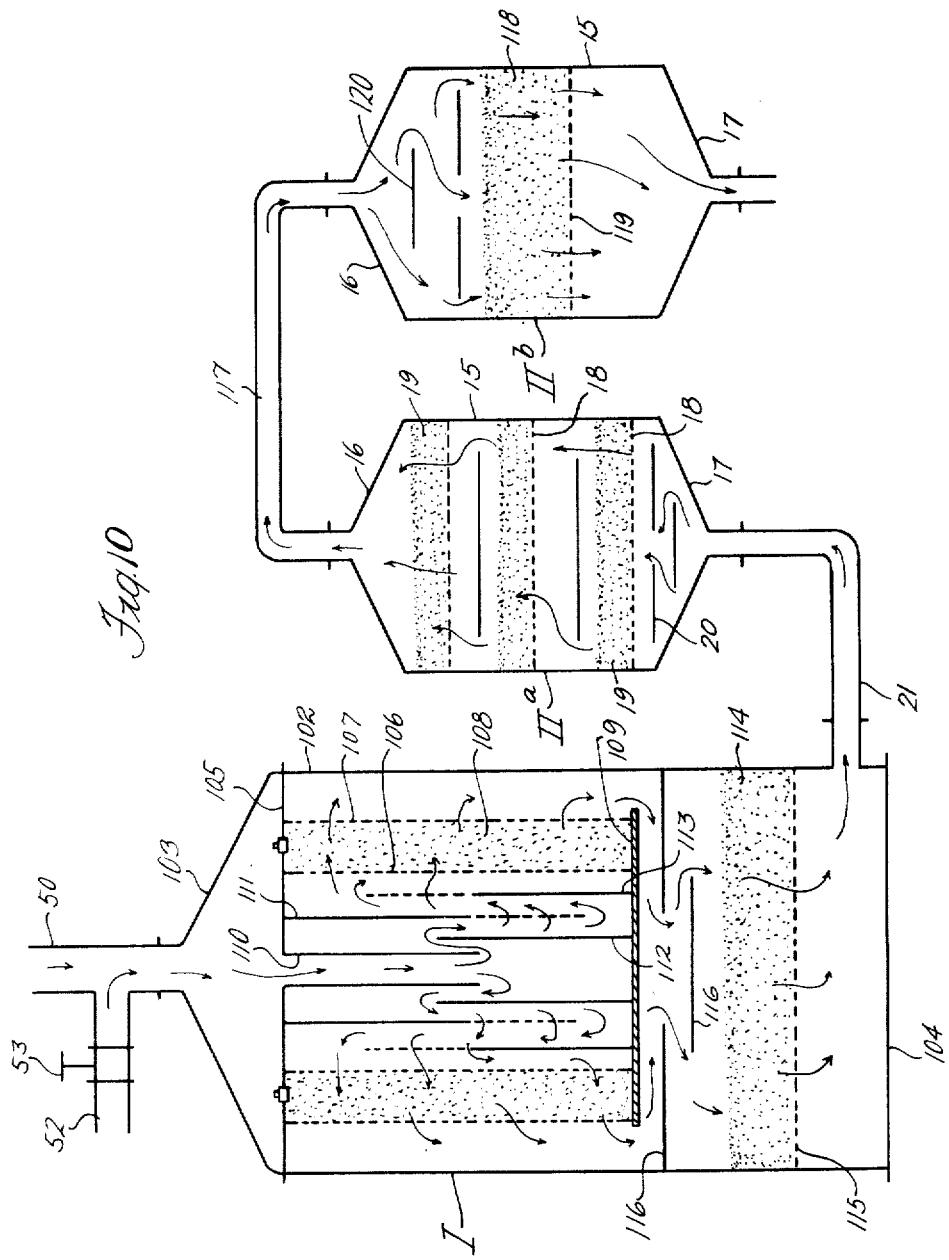

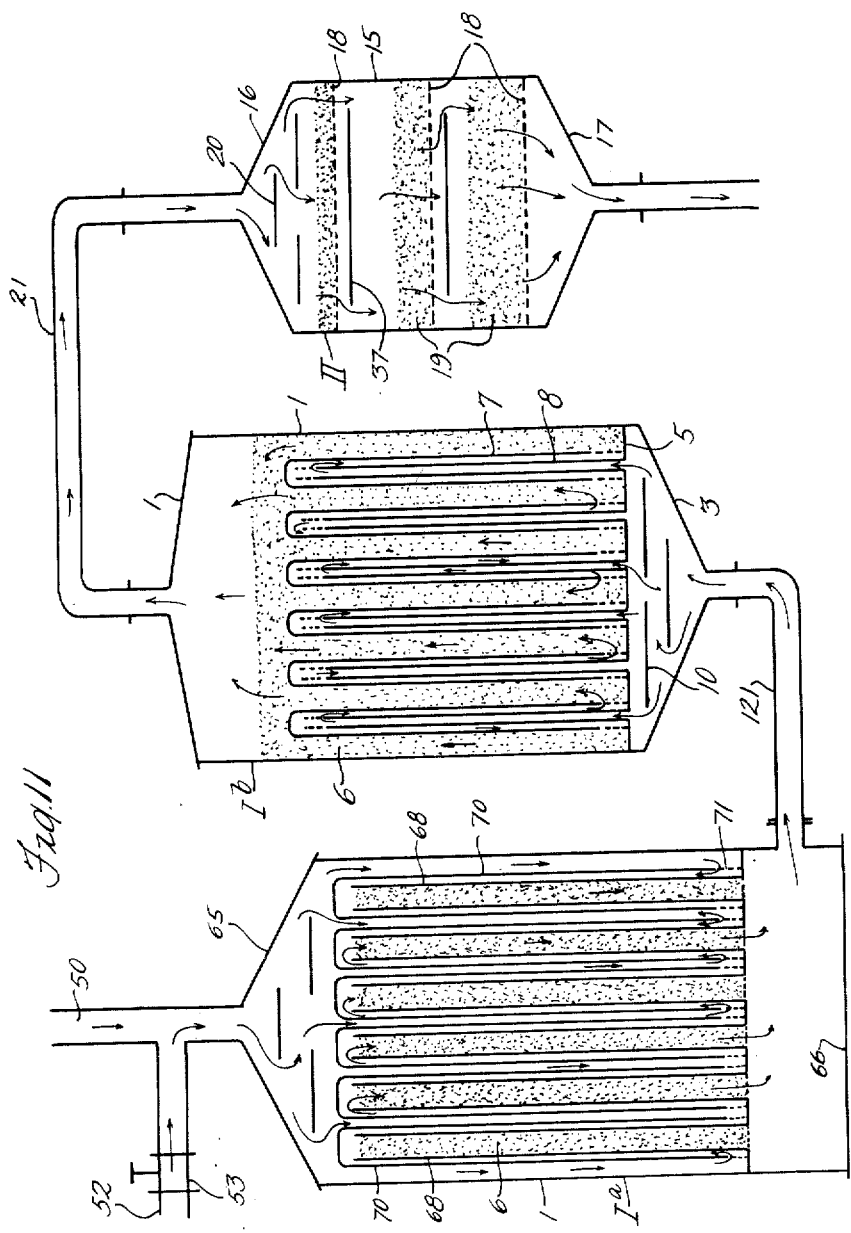

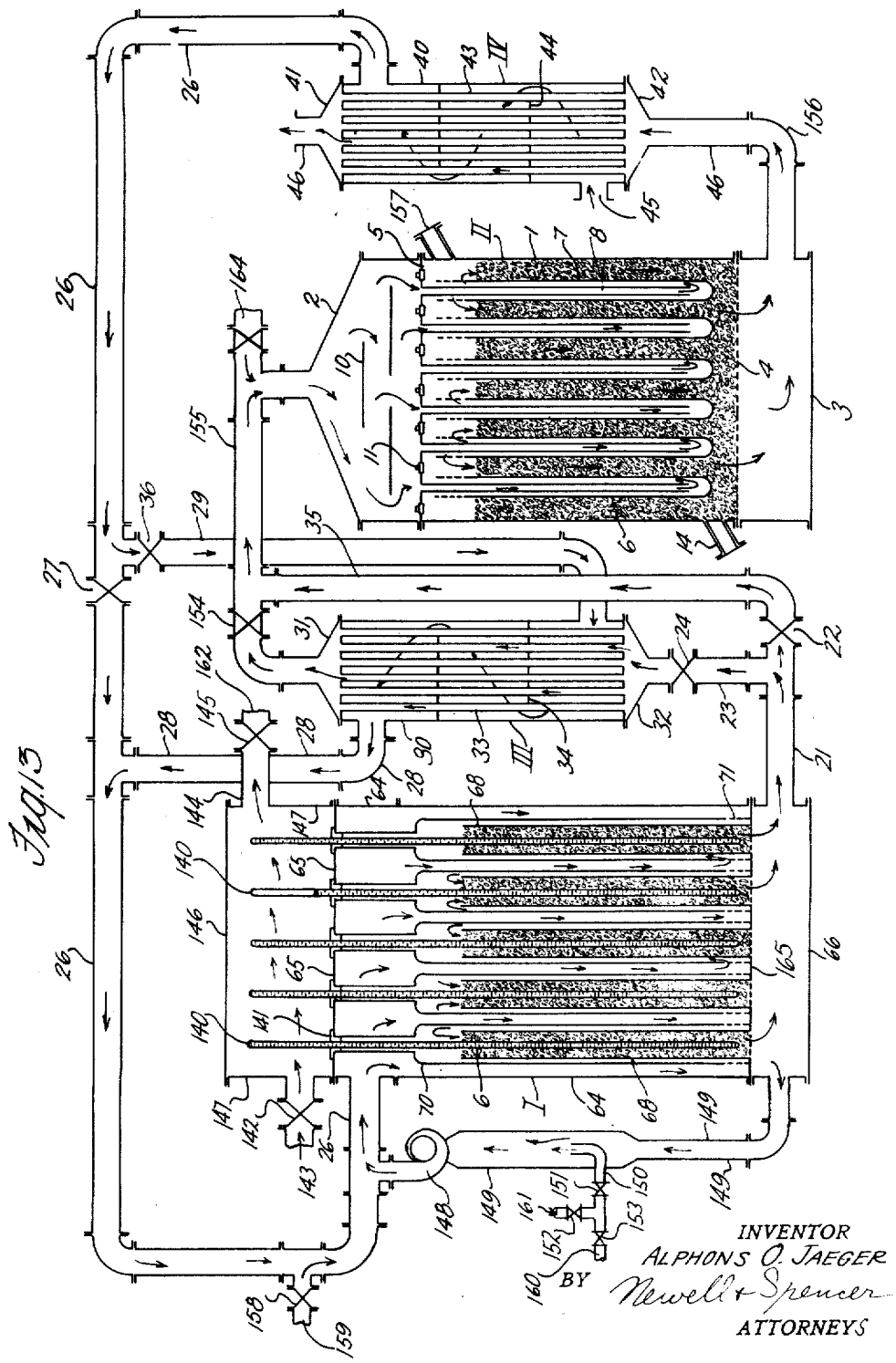

Feb. 28, 1928.

A. O. JAEGER 1,660,511

CATALYTIC APPARATUS

Filed Jan. 19, 1927  11 Sheets-Sheet 11

INVENTOR
ALPHONS O. JAEGER
BY Newell + Spencer
ATTORNEYS

Patented Feb. 28, 1928.

1,660,511

UNITED STATES PATENT OFFICE.

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE.

CATALYTIC APPARATUS.

Application filed January 19, 1927. Serial No. 162,030.

This invention relates to methods and apparatus for carrying out catalytic reactions in the vapor phase.

Vapor phase catalytic reactions, and, particularly such reactions as are strongly exothermic, present numerous difficulties in controlling the heat of reaction. The gases striking the first layers of contact mass contain the greatest concentration of reacting ingredients, and, therefore, produce the most intense reaction. The reaction speed slowly decreases as it nears completion, necessitating considerable length of travel through the catalyst.

Overheating may have a number of serious results. In the first place, the catalyst may be destroyed if it is not resistant to high temperatures. Secondly, the reaction may be carried too far as, for example, in certain organic oxidations where it is desired to produce an intermediate oxidation product. A third difficulty arises in reactions in which too high a temperature results in an incomplete reaction, as in many exothermic reactions, overheating tends to push the equilibrium away from complete reaction. The relative importance of these disadvantages varies, of course, with the particular reaction to be carried out and the principles of the invention, which will be described below, must be adapted to any particular reaction with due consideration to the conditions under which it takes place.

It has been proposed in the past to carry out exothermic catalytic reactions in the presence of powerful cooling agents, either liquids or gases, or to subdivide the catalyst so that heat is given off by radiation. When properly applied, these methods prevent overheating and may prevent in some reactions, the production of undesired byproduct. There is, however, a very serious disadvantage in that the whole of the catalyst is cooled and the reaction speed is lowered, particularly in the portions of the catalyst which encounter the almost completely reacted gases. This brings about a serious dilemma. Either the catalyst layer must be made enormously long with a tremendous cost in catalyst, or else the speed, with which the reaction gases pass through the catalyst, must be reduced to a very low point, which also results in an uneconomical utilization of the catalyst. A further difficulty arises due to the fact that the cooling, which may be satisfactory and essential to the portions of the catalyst encountering the fresh gases, may be too great for those portions which encounter gases that are partly reacted.

According to the present invention, large outputs and an excellent temperature regulation are made possible by dividing the reaction into a plurality of converters, the first converter being provided with powerful cooling means and in the preferred embodiments of the invention with self regulating cooling means. The second, or following, converters may be provided with no cooling means at all or with less intense cooling means and the catalyst depth and converter arrangement can be accurately controlled so as to provide for the very best catalytic conditions at any point in the reaction.

It is also possible in some of the preferred embodiments of the present invention to enormously increase the output by running the powerfully cooled first converter with gas speeds far in excess of any economical speed in a single converter. The powerful cooling means prevents overheating and the fact that excessive gas speeds do not give a satisfactory high percent of yield for commercial work is immaterial, since the partly reacted gases are then passed through other converters wherein the catalyst is arranged so as to bring about a maximum percentage conversion. The total output may be in some cases from two to five times that which is possible in a single converter having the same amount of catalyst.

The division of the process into a number of converters also permits accurately controlling the gas temperature on entering any of the converters by suitable heat exchangers, either fixed or adjustable, situated between the different converters. This is a very important advantage of the present invention in the case of reactions such as the catalytic oxidation of sulfur dioxide where it is essential to keep the temperature under control not only in the catalyst layers, which are subjected to fresh gases, but also in the last catalyst layers which are required to effect the last few percent of reaction. This is due to the fact that the reaction is an equilibrium reaction which is relatively sensitive to temperature. The arrangement of heat exchangers between the converters is also important in many organic oxidations such as for example oxidations of aromatic compounds where intermediate components of low heat stability are formed and where it is necessary to rapidly cool down the partly reacted gases before subjecting them to contact with additional catalyst layers. Important as the possibility of temperature adjustment between converters is, however, the invention is not limited to this feature and in some cases where it is not so essential to provide for an interconverter temperature adjustment this feature may be omitted and such processes and arrangements are included in the present invention.

The invention will be described in greater detail in connection with the drawings, in which Figure 1 illustrates the combination of a converter with automatic gas cooling with an ordinary layer converter of the Grillo type, heat exchangers being provided between the converters;

Fig. 2 illustrates a modified construction of automatically gas cooled converter and layer converter with an adjustable intercooler;

Fig. 3 illustrates a modified form of automatically gas cooled converter with an individual heat exchanger combined with an ordinary layer converter;

Fig. 4 illustrates a combined automatic gas cooled converter and layer converter associated with a separate layer converter and heat exchanger;

Fig. 5 illustrates the combination of a Tentelew converter combined with a layer converter without intercooler;

Fig. 6 illustrates a modified Tentelew converter combined with a single layer converter without intercooler;

Fig. 7 shows a modified automatic gas cooled converter associated with a double layer converter without intercooler;

Fig. 8 is a horizontal section through Fig. 7 along the line 8—8;

Figure 9 illustrates a combination of another type of Knietsch tubular converter with a layer converter;

Fig. 10 illustrates a combined annular and layer converter associated with two different types of separate layer converters in series;

Fig. 11 illustrates the combination of two automatic gas cooled converters in series with a separate layer converter;

Fig. 12 illustrates a liquid cooled tubular converter in series with a separate layer converter; and Figs. 13 and 14 illustrate the combination of two automatically gas cooled converters in series, one of them being provided with evaporative means for equalizing the cooling.

Figure 14:
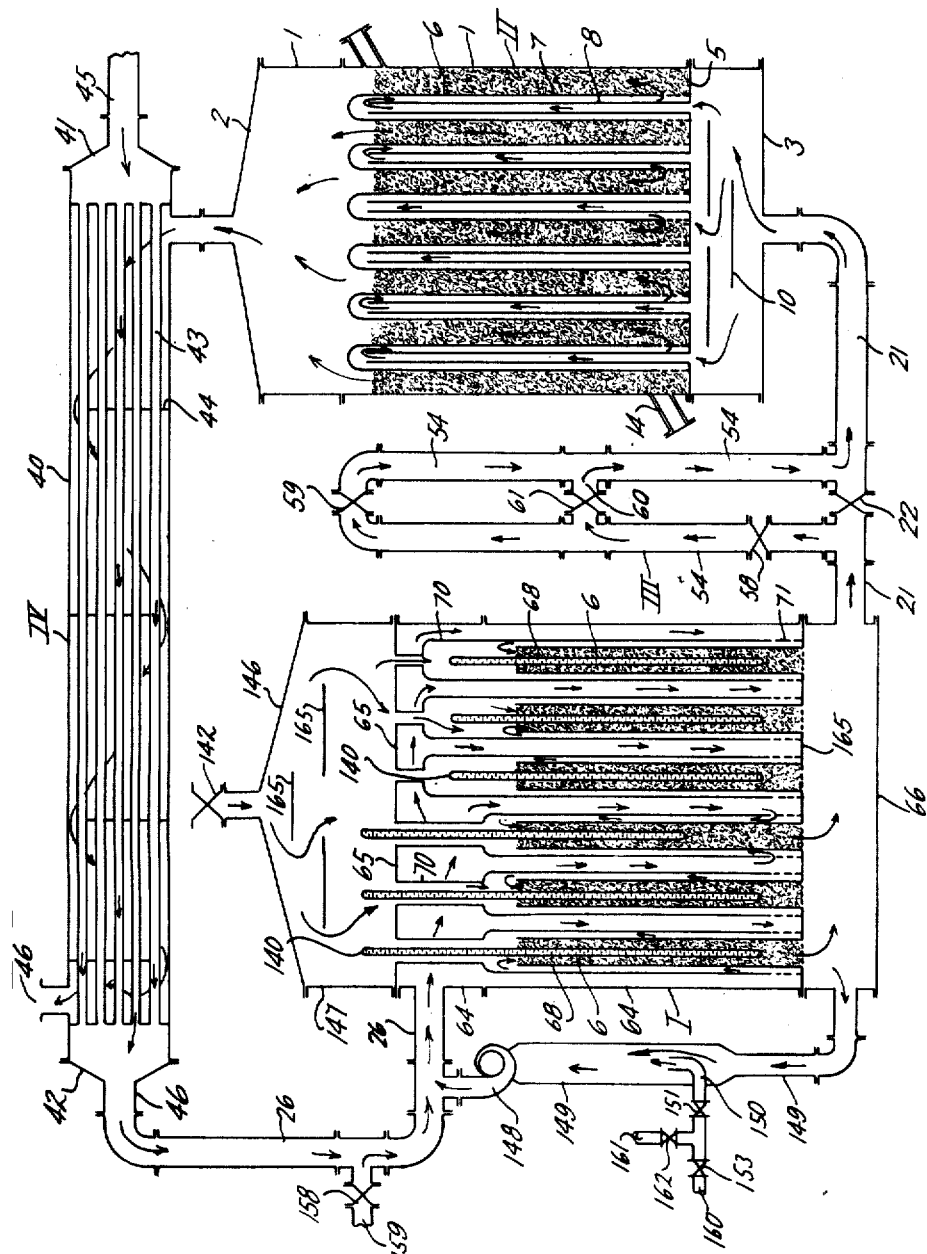

In the construction shown in Fig. 1, the gas cooled converter I consists in a shell 1, top piece 2, bottom piece 3, perforated catalyst support 4 and upper partition 5. A catalyst 6 is supported on the plate 4 and extends almost up to the plate 5. In the catalyst are embedded closed bottom tubes 7 having open ends extending above the catalyst level. Open end tubes 8 hang from the plate 5 and extend practically to the bottom of the tubes 7. Suitable orifice plates 9 are mounted in the upper ends of the peripheral tubes 8, the orifices decreasing in size from the central tubes toward those on the periphery. Baffles 10 are also arranged in the inlet chamber formed between the plate 5 and the top piece 2. The catalyst is filled into the converter through holes in the plate 5 which are then closed with plugs 11. An emergency cold gas main 12 connects with the upper portion of the catalyst space by the short connecting pipes 13 and a suitable drainage pipe 14 is provided for removing spent catalyst.

With the converter is associated a second converter II of a simple two-layer Grillo type. This converter consists in a shell 15, top piece 16, bottom piece 17, perforated catalyst trays 18 and catalyst layers 19. Baffles 20 are placed in the inlet chamber between the bottom piece 17 and the lower tray 18 in order to distribute and mix the incoming gases.

Two heat exchangers III and IV are associated with the converters and consist respectively in shells 30 and 40, upper pieces 31 and 41, lower pieces 32 and 42, heat exchange tubes 33 and 43, and baffles 34 and 44.

A pipe 21 connects the bottom chamber of the converter I to the bottom chamber of the converter II and is provided with a valve 22. A branch 23 provided with a valve 24 enters the pipe 21 between the converter I and the valve 22 and connects the pipe to the bottom piece 32 of the heat exchanger III. Pipe 25 connects the top piece 16 of the converter II to the top piece 41 of the heat exchanger IV, while a pipe 26 provided with a valve 27 connects the upper portion of the shell 40 of the heat exchanger IV to the top piece 2 of the converter I. A branch pipe 28 runs from the upper portion of the shell 30 of the heat exchanger III to the pipe 26, entering the latter at a point between the valve 27 and the converter I. A pipe 29 connects the pipe 26 with the lower portion of the shell 30 of the heat exchanger III and a pipe 35 connects the top piece 31 of the same heat exchanger with the pipe 21. The pipe 29 which is provided with the valve 36 enters the pipe 26 between the valve 27 and the heat exchanger IV, whereas the pipe 35 enters the pipe 21 between the valve 22 and the converter II. The heat exchanger IV is further provided with an inlet 45 into the lower portion of the shell and an outlet 46 from the bottom piece 42.

In operation, gases pass in the direction indicated by the arrows into the shell of the heat exchanger IV through the inlet pipe 45 and flowing over the tubes 43 in a sinuous path defined by the perforated baffles 44, pass through the pipe 26 into the top piece 2 of the converter I. The gases may pass directly into the converter or they may go through the pipe 29 into the heat exchanger III, flowing over the tubes 33 in a sinuous path defined by the perforated baffles 34 and finally flow into the pipe 26 through the pipe 28. The relative proportion of the gases flowing directly into the converter and those flowing by way of the heat exchanger is determined by suitable adjustment of the valves 27 and 36. By this means, the gases can be given the desired degree of heat before entering the converter.

After entering the converter, the gases are thoroughly mixed and distributed by the baffle plates 10 and pass down through the central tubes 8 in amounts which increase from the periphery toward the center, since the orifice plates 9 provide smaller passages near the periphery gradually increasing toward the center to the full size of the tubes. After passing down through the tubes 8, the gases strike the bottom of the tubes 7, their flow is reversed and they flow upwardly through these tubes in direct heat exchanging relation with the catalyst, finally issuing from the top of the tubes where their direction is again changed and they flow downwardly through the catalyst, passing out through the perforated plate 4 into the bottom chamber of the converter. Additional hot or cold gases can be directly passed into the catalyst from the main 12 through the pipes 13.

The converter possesses tremendous cooling powers due to the construction of the heat exchanging elements which are not claimed in the present invention, but form the subject-matter of the application of Jaeger & Bertsch, Serial No. 100,818, filed April 9, 1926. The provision of means for circulating a relatively larger amount of gas through the central tubes is also not claimed in this invention, but forms the subject-matter of my copending application, Serial No. 144,496, filed October 27, 1926.

As the central portions of the catalyst are not as effectively cooled as the peripheral portions due to the lack of radiation from the shell, additional gas flow serves to compensate for this effect and brings about an even temperature throughout the whole of the catalyst layer, preventing undesirable overheating in the center. As the cooling effect of the heat exchanging elements varies substantially directly as the amount of gas passed through the converter and the amount of heat evolved is also substantially proportional to the amount of gas flowing through, the converter will be satisfactorily cooled throughout a wide range of gas velocities and automatically adjusts itself to fluctuations, acting thus as an automatic gas cooled converter. Since the radiation from the shell, however, does not increase with the increased flow of gas, it may be desirable to compensate for the lack of increase in cooling effect by passing directly some cold gas through the main 12. Similarly, the temperature can also be varied by varying the temperature of the incoming gases, i. e., by varying the proportion of the incoming gases which pass through the heat exchanges III.

The automatic cooling features of the converter make it possible to operate it under enormous overloads, sometimes amounting to more than 5 times the normal converter rating without producing undesirable overheating. Of course, with greatly increased gas velocities, the percentage of conversion will naturally drop, but as the partly reacted gases are later on to be subjected to further conversion, this factor is naturally of no importance and the converter can be pushed to the limit, permitting enormous outputs per unit of catalyst.

The hot gases from converter I are led to converter II where they pass through the catalyst layers and the reaction is completed. The temperature of the gases as they leave converter I, especially when the latter is pushed to outputs many times higher than those normally obtained, are at a temperature which is usually too high to permit cooling the reaction to a satisfactory degree of completion even though they may not be hot enough to damage the catalyst in converter II. For this reason, the temperature of the gases passing out into the pipe 21 is advantageously decreased by passing part or all of the gases through the heat exchanger III. This is effected by suitable adjustment of the valves 22 and 24 which determine the relative proportions of gas flowing through the heat exchanger III. The flow, of course, is directly through the tubes 33 into the top piece 31 and thence through the pipe 35 back into the pipe 21. When a portion only of the gases are passed through the heat exchanger III, the temperature of the united gas streams into the bottom piece 17 of the converter II may not be uniformly mixed and for this purpose, baffles 20 are provided in the converter II to effect a thorough mixing and hence, equalization of temperature of the incoming gases. The heat abstracted in the heat exchanger serves, of course, to heat up the cold gases which are on their way to converter I.

Passing through the converter II, the gases are, of course, further heated up, although, usually to a smaller degree than in converter I, since only a small percentage of the reaction takes place in converter II. The latter converter is provided with little or no cooling, depending solely on the radiation of the converter shell assisted by the fact that the baffle plates drive the gases from the center of the converter into contact with the shell. Strong cooling means are usually not necessary in the second converter as the reaction does not generate sufficient heat to become dangerous. The reacted gases which are, of course, at approximately reaction temperature or higher, pass from the top piece 16 through the pipe 25 into the top piece 41 of the heat exchanger IV, flowing through the tubes 43 into the bottom piece 42 and thence out through the exhaust opening 46. During their passage through the heat exchanger, the reacted gases give up a considerable proportion of their heat to warm up the incoming cold gases.

It should be noted that the arrangement of the two converters which are not in heat exchanging contact with each other presents a number of advantages. In the first place, converter I, which can be forced to enormous outputs, is relatively small compared to its output and as it constitutes the more expensive converter type, a marked saving is thereby effected. Converter II, which can be of the layer type and requires but little cooling provision, is of the cheapest possible construction and can be of a size which is ample to produce a satisfactory percentage yield. In other words, the output of the more expensive portion of the installation is enormously increased which results in a considerable saving.

A further very notable advantage consists in the fact that the two converters are entirely independent in their arrangement and the gas velocity through the catalyst in the converters, which, of course, is determined by the catalyst cross sectional area, can be varied to bring about the best results. Thus, for example, in most reactions tremendous output, but a relatively lower percentage yield, can be effected by using enormous gas velocities and accordingly converter I is usually built with a relatively small catalyst cross section. On the other hand, it is desirable, in order to bring about the highest percentage yields, to slow up the gas speed through the last catalyst layers in order to give the reaction, which is practically always an equilibrium reaction, time to proceed as completely as possible in the desired direction. This is easily effected by providing a very large cross section in the converter II with a correspondingly sluggish gas flow and resulting high percentage yield. This feature is not emphasized in the drawings which are purely diagrammatic. It should be understood that the relative cross section of gas passage in converters I and II are to be determined by the particular condition of the reaction which is to be carried out therein.

A further important feature for many reactions lies in the fact that the catalyst layer in converter II is not exposed to radiant heat from the catalyst in converter I. As a result, there is no tendency for any portion of the catalyst in converter II to become overheated and its temperature is determined purely by the condition of the gas passing through it. This is clearly brought out by a comparison of the present invention with the modification shown in Fig. 9 and particularly in Fig. 11 of the application of Jaeger & Bertsch, Serial No. 100,818, filed April 9, 1926, referred to above. In these figures, the layer of uncooled catalyst is placed below the cooled catalyst layer in order to complete the reaction. The layer, however, is exposed to the full radiant heat of the highly heated catalyst layer above it and the gases also convey a large amount of heat to it by convection. The layer, therefore, is heated to a high temperature which in many cases markedly decreases the yield. The present invention which permits a control of the temperature of the catalyst layer in each converter dependent only on the gas conditions permits operating under the most favorable conditions at all times and in many reactions, particularly reactions which are relatively sensitive to temperature, a very great increase in efficiency is possible.

It should be understood that the drawings are purely diagrammatic in nature, only such structural features being shown as are necessary to an understanding of the invention. In every case, the exigencies of the particular reactions to be carried out will determine what structural design is to be used and all necessary structural features and accessories and the like will be used as will be apparent to the skilled chemical engineer. Suitable provision for charging the converter with catalyst will also be provided as is indicated in some of the drawings. These details of structure and accessories do not per se form any part of the present invention, which, on the contrary, is applicable to any desired converter structure.

Fig. 2 illustrates a somewhat modified arrangement of two converters similar to that shown in Fig. 1. Analogous parts are given the same reference characters. The installation consists in converters I and II, the intercooler III and a heat exchanger IV. The design of the heat exchanger IV is identical with that shown in Fig. 1 and converter II is also similarly arranged.

Converter I consists in a modified type of converter such as that shown in Fig. 12 of the application of Jaeger & Bertsch, referred to above. In this converter, the top piece 2 is not directly connected to the shell 1, but is separated therefrom by two flanged shell segments 38, carrying an additional perforated partition 39 which is provided with tubes 47, extending through additional holes in the partition 5 and being provided with deflecting plates 48 and perforations 49 at their lower ends. The details of the design are the same as shown in Figs. 12 and 15 of the application of Jaeger & Bertsch above referred to.

The top piece 2 is connected to a gas main 50 which is provided with a valve 51, the upper portion of the shell 40 of the heat exchanger IV connects to the chamber formed by the flange 38 and partitions 5 and 39 through the pipe 26, into which pipe an additional gas main 52 is led which is provided with a valve 53. Instead of tubes having one open end and one closed end embedded in the catalyst, tubes 57 are provided having a closed lower end and an upper end welded or fastened onto the inner tubes 8. The tubes 57 are embedded in the catalyst for their whole length and are provided with perforations 56 at their upper end. The inner tubes 8 are preferably provided with perforations 55 at their lower ends.

Hot gases from the bottom of the converter I pass through a pipe 21 either directly into the converter II or through an intercooler III. This intercooler III consists in a U-shaped pipe 54, both legs leading into the pipe 21, in which the valve 22 is placed between the two legs. A valve 58 is provided in the left or entering leg of the U-shaped tube and a valve 59 is also provided in the upper bend of the U-shaped tube. A cross pipe 60 provided with a valve 61 joins the right leg of the U tube to the left leg between the valves 58 and 59. The tube is not provided with heat installation and may, if desired, be provided with suitable heat dissipating means such as fins or the like. Part or all of the hot gases in pipe 21 may be caused to pass throughout the whole length of the U tube or across the cross pipe 60 of the U tube as desired. In the former case, the valve 61 is closed and valve 59 is opened, and in the latter case, valve 59 is closed and valve 61 is opened. The relative amount of gas passing through the U tube and direct through the pipe 21 is, of course, determined by suitable adjustment of the valves 22 and 58.

In operation, gas passes in through the pipe 45 and thence through the heat exchanger IV into the chamber between the partitions 5 and 39 in a manner similar to that described in connection with Fig. 1. Thence, the gas passes down through the inner tubes 8, up along the inner wall of the tubes 57, out through the perforations 56 and down through the catalyst layer. Additional cold gas may be introduced through the main 50 into the top piece 2, whence it passes through the tubes 47 and directly through the catalyst. The deflecting plates 48 prevent blasts of cold gas striking restricted portions of the catalyst and cooling them to a point where the reaction will no longer proceed. In passing through the pipes 47, of course, the gas is partly warmed by the heated gas entering through the pipe 26. The general effect is similar to that in Fig. 1, but for some purposes is preferable, as the additional cold gas, instead of entering directly into the catalyst space, as shown in Fig. 1, is first partly warmed by the heated gases and is less apt to produce abrupt or localized temperature changes.

Where additional cooling is desired, cold gas can be introduced through the main 52 into the pipe 26. In general, the modification shown in Fig. 2 is preferable where highly exothermic reactions are encountered. It is not as suitable for reactions which require a high inlet gas temperature. It should be understood, of course, that there is no particular necessity of combining an intercooler with the particular design of converter I. On the contrary, an intercooler may be used in place of a heat exchanger III in the arrangement shown in Fig. 1 and vice versa a heat exchanger can be used in Fig. 2 instead of an intercooler. In general, in the drawings, I have attempted to illustrate several different types of converter, without, however, limiting the invention to the particular combination of converters shown.

Fig. 3 illustrates a combination of a converter I, a second converter II, and a heat exchanger IV, without an external heat exchanger or intercooler between the converters. This function is performed by an extension of the tubes 7 and 8 which pass through the catalyst layer and which in their bottom reaches perform the function of heat exchangers, cooling off the heated gases and at the same time heating up the incoming gases, baffles 62 being provided to increase the path of gas travel. The arrangement of converter II and heat exchanger IV is identical with that shown in Fig. 1 and the gas flow during operation is similar, being clearly shown by the arrows.

The internal heat exchanger combined with the converter I and which is similar in design to that shown in Fig. 6 of the Jaeger & Bertsch application, referred to above, presents many advantages from a structural standpoint. The arrangement is exceedingly compact and permits the maintenance of a relatively even temperature throughout the catalyst zone, since the gases passing upwardly through the tubes 7 are first heated up not only during their passage through the tubes 8, but by the hot reaction gases flowing over their lower reaches so that at no point do relatively cold gases come in heat exchanging contact with the catalyst. This uniform moderate cooling, which, however, possesses all the automatic advantages of increase in heat evolution is especially suitable for reactions which require high inlet gas temperatures and which are not excessively exothermic.

No provision is made in the converter for varying the relative flow of gas through the central and peripheral heat exchanging elements, but this can be effected, as shown in Figs. 1 and 2, wherever it may prove desirable.

Fig. 4 illustrates a somewhat different arrangement of converters without intercoolers. The converter I is an inverted converter, similar in design to that illustrated in Fig. 14 of the Jaeger & Bertsch application, above referred to, but being provided with an additional catalyst layer 63 arranged somewhat similar to that shown in Fig. 11 of the same application. The baffle 64 is placed between the main catalyst layer and the layer 63 in order to prevent gases from the main catalyst layer directly striking the layer 63 and to provide a more thorough mixture of the partly reacted gases. The baffle also serves the purpose of directing the gases against the converter shell and thereby enhancing the cooling. In converter II, it should be noticed that the catalyst layers increase in depth in the direction of gas flow which is desirable in many cases, as the progressively reacted gases require an increasingly long contact with the catalyst in order to result in substantially complete conversion. A similar variation of catalyst depth may, of course, be utilized in the second converters shown in the other figures. The heat exchanger IV and converter II are inverted, but operate in precisely the same manner as in the other figures.

The arrangement in Fig. 4 presents certain advantages where the exothermic reaction carried out tends to proceed with extreme rapidity in the portion of the contact mass which encounters the fresh gases, but which tends to slow up in the passage through further layers of catalyst and may be insufficient to maintain sufficient heat for completion. The inverted converter structure shown in Fig. 4 and the absence of an intercooler between the converters permits maintaining the catalyst layer 63 and the catalyst mass in the second converter at suitable temperatures. It is also possible to use catalyst layers of great depth in the second converter which is advantageous for complete conversion. It is also frequently desirable to provide a second converter with much more active catalysts to make up for the decreasing concentration of unreacted gases. In such cases, it may even be desirable to provide a certain amount of cooling of the gases between converter I and converter II. This may be effected by omitting heat insulation from the pipe 21 or by providing a suitable intercooler or heat exchanger. In general, it should be understood that wherever the connecting pipe or pipes between the converters are permitted to radiate considerable amounts of heat, they are really acting as intercoolers and it is impossible to draw any sharp line between a mere connecting pipe and a definitely designed intercooler. In fact, every uninsulated connecting pipe should be considered as an intercooler and is intended to be included under this term whenever it is used in the specification and claims.

Fig. 5 illustrates a very simple combination between the well known Tentelew converter and a simple layer converter of the Grillo type. The Tentelew converter I consists in an outer shell 64, upper piece 65, bottom piece 66, partition 67, catalyst tubes 68 and baffle plates 69. Gas enters through the mains 50 and 52, the latter being provided with a valve 53, and the main 50 being connected to the top piece 65. The gases, which are thoroughly mixed and deflected by the baffle 69, surround the catalyst tubes and finally pass down through the catalyst in the tubes. Owing to the enormous radiation surface of the tubes, a satisfactory cooling is effected which is semi-automatic in nature in that the cooling increases to a certain extent with increased gas flow but not strictly proportionately thereto as in the gas cooled converter shown in the foregoing figures. It is accordingly possible with reactions which are not unduly sensitive to push the Tentelew converter to outputs very much in excess of its normal output with, of course, a corresponding decrease in percentage yield.

The partly reacted gases then pass through the pipe 21 into the converter II, as in the other figures. An intercooler or heat exchanger may be used if desired or the pipe 21 may be left uninsulated to perform the functions of an intercooler. Of course, the gases passing out from the converter II may pass through an external heat exchanger in order to heat up the incoming gases entering the main 50 as is shown in the other figures. In general, it should be understood that the intercoolers or heat exchangers between the converters may be omitted in any of the constructions shown without affecting the broad scope of the invention, but for best results in strongly exothermic reactions, some form of intercooler or heat exchanger is exceedingly desirable and in some delicate reactions essential, and, therefore, constitutes an important specific feature of the present invention, although not limiting its broad scope.

Fig. 6 is similar to Fig. 5, but illustrates an important new modification of the Tentelew converter, which, however, I do not claim in the present application as this forms the subject-matter of my co-pending application, Serial No. 146,525, filed Nov. 5, 1926. In this modification, the closed end tubes 70, provided at their lower ends with perforations 71, are placed over each of the Tentelew tubes 68. The incoming gases are, therefore, forced to pass down over the tubes 70, in through the perforations 71 and up between the tubes 70 and the tubes 68 before passing down through the catalyst in the latter. By this means, the semi-automatic Tentelew converter in which the cooling is by radiation is transformed into a fully automatic, gas cooled converter of tremendous effectiveness, the cooling varying directly as the gas speed and permitting enormously increased outputs. The arrangement of the two converters aside from the additional tubes 70 is identical with that in Fig. 5 and the same considerations and advantages described with respect thereto apply to the converters shown in Fig. 6, which embodiment in addition possesses the advantage of a fully automatic gas cooled converter I.

Figs. 7 and 8 illustrate a combination of a novel type of gas cooled converter with an ordinary layer converter. The gas cooled converter consists in a shell 72, top piece 73, bottom piece 74, and perforated partition 75. On the partition is placed a closed end tube 76 with the closed end down. Surrounding this tube are a series of concentric, cylindrical troughs 77 and 78. Between the tube 77 and the troughs 78 the catalyst is arranged in concentric annuli 79 (see Fig. 8). Between the outer catalyst ring 79 and the converter shell 72 is placed an annular hollow metal ring 80 in order to prevent undue cooling of the outer catalyst ring by radiation.

A closed end hollow metal ring 81 is placed over the closed end tube 76 and ring 77 so that the open end of the inner wall extends down to the bottom of the tube 76, being provided with the perforations 82 and the outer wall extends down to the bottom of the ring 77, being provided at its lower end with the perforations 83. A second concentric ring 84 similarly has its inner wall extending into the ring 77 and is provided at its lower end with the perforations 85 and its outer wall extending down into the outer ring 78, being provided at its lower end with the perforations 86. A third concentric annular member 87 of L-shaped cross section is arranged with the outer end of its horizontal face connected to the shell 72 and the vertical leg extending into the ring 78 and provided at its lower end with the perforations 88. It will be apparent that the inner wall of the inner annulus 81 forms a tube open at both ends and extending into the tube 76 and that the outer wall of this annulus with the inner wall of the annulus 84 defines an annular space extending down into the annulus 77. A similar space is also formed by the vertical leg of the ring 87 and the outer wall of the annulus 84 and extends into the annulus 78. The gas entering through the main 50 mixes, if desired, with other gases entering through the main 52 provided with the valve 53, and passes down through the central space of the annulus 81 and the spaces between the annuli 81, 84 and 87 to the bottom of the tube 76 and the annuli 77 and 78, where the direction of gas flow is reversed and the gases pass upwardly in contact with the walls of the tubes 76 and annuli 77 and 78 in heat exchanging relation with the catalyst rings. After issuing from the top of these spaces, they then again reverse and pass downwardly through the catalyst. It will be noticed that the effect is almost identical with that of the converters shown in Figs. 1 to 4 except that instead of small tubular elements embedded in the catalyst, annular cooling elements are so embedded. The cooling, of course, is in direct proportion to the amount of gas passing through and undue cooling of the outer catalyst ring is prevented by the air space between it and the converter shell. The operation of the converter is the same as that shown in Fig. 1, for example, but the annular construction of elements presents many advantages from a structural standpoint. It is easily possible to vary the thickness of the catalyst rings so as to get an absolutely even cooling which is much more difficult with embedded elements as the distance between elements is not entirely uniform, whereas in the catalyst rings, shown in Fig. 7, the distance between the ring walls is constant.

The converter II is similar in design to that shown in the foregoing figures and the operation is the same. If desired, an intercooler or heat exchanger can be interposed between the converters or the pipe 21 can be left uninsulated so as to perform the functions of an intercooler as described in connection with the foregoing figures.

Fig. 9 illustrates a combination of a well known type of converter of the Knietsch type, extensively used for catalytic sulfuric acid, with an ordinary layer converter. In the converter I, the catalyst is arranged in tubes 91, which are mounted in partitions 92 and 93 and form with the tubes, top piece 94, an internal unit. This unit is surrounded by an intermediate shell 95 and an outer shell 96. Gases from the main 50 pass directly into the space between the shells 95 and 96, entering at the upper portion of the shell and passing downwardly into perforated distributing tubes 98, whence the gases pass up between and around the catalyst tubes 91 and finally through the space between an external top piece 99 and to the top piece 94 into the latter, being thoroughly mixed by passing around baffles 100. The gases thus form a gas jacket which prevents heat losses by radiation from the shell 95. A portion of the gases pass through the pipe 97 provided with the valve 101 directly into the lower distributing tube 98. The gases after passing downwardly through the tubes into the bottom chamber below the partition 93 are conducted to converter II through the pipe 21.

Converter I is not fully automatically gas cooled, since the cooling does not increase proportionately with the gas flow, but an excellent cooling is achieved and the converter can be pushed to outputs many times the normal output without overheating particularly in reactions such as the catalytic oxidation of sulfur dioxide. The percentage yield, of course, drops, but is brought up to a high point by the converter II. Suitable heat exchangers and intercoolers, as shown in some of the other figures, may, of course, be used.

Fig. 10 shows a combination of an annular gas cooled converter with two layer converters in series. The annular converter, which is similar to that described and claimed in my co-pending application, Serial No. 146,525, filed Nov. 5, 1926, and which does not per se form any part of the present invention, consists in a converter shell 102, top piece 103, bottom piece 104, and upper partition 105. From this upper partition depends a perforated annular catalyst chamber having an inner wall 106, outer wall 107, and annular catalyst layer 108. The bottom of this chamber is fastened to a lower partition 109 which does not extend fully across the converter. A central open-ended tube 110 also depends from the partition 105, surrounded by a concentric cylindrical wall 111 extending almost down to the partition 109 and being provided with perforations throughout its lower reaches. Baffle cylinders 112 and 113 extend upwardly from the partition 109 between the tube 110 and baffle 111 and between the baffle 111 and catalyst chamber respectively. The upper reaches of the open-ended cylinder 113 are provided with perforations.

An uncooled catalyst layer 114 is supported by the perforated plate 115 in the lower portion of the converter and baffle plates 116 are arranged between it and the partition 109. A pipe 21 connects the chamber divided by the bottom piece 104 and the plate 115 with the layer converter II$^a$ provided with three catalyst layers, whence the gases after further reaction pass through the pipe 117 into the deep single layer converter II$^b$ containing a catalyst layer 118 supported by a perforated plate 119, baffles 120 being provided for diffusing the gas over the catalyst.

In operation, the fresh gases coming in through main 50 with or without additional gas from the main 52, regulated by the valve 53, pass downwardly through the tube 110 and then through a sinuous path over the baffle tubes and cylinders 111, 112 and 113, finally passing outwardly through the catalyst and then downwardly over the baffles 116, through the catalyst layer 114 and thence in series through the converters II$^a$ and II$^b$. The converter I is not automatically gas cooled, but the catalyst annulus 108 is so thin that the heat is rapidly radiated to the baffle cylinders and to the shell of the converter and the gases flowing through the catalyst layer rapidly carry the heat to the converter shell. The baffles are kept cool by the incoming gases which are in turn heated up thereby. The faster the gases pass through the apparatus, the shorter the period of time they are exposed to the heat of the radiant heat from the catalyst and to the hot baffle cylinders and correspondingly, the cooler they are when they encounter the catalyst. There is thus an increase in cooling effect with increased gas speed which is enhanced by the fact that the faster the gases pass through the catalyst, the greater is the tendency for them to carry the heat generated in the catalyst to the converter shell 102 against which they impinge before being deflected downwardly. Additional cooling is, of course, effected by the baffles 116 which force the gases to flow outwardly into contact with the lower portion of the shell where they are still further cooled before passing through the catalyst layer 114. Some of the baffles 116 may also be connected to the shell 102 and serve to conduct heat to it, although their primary function is to deflect and thoroughly mix the partly reacted gases. The thin catalyst layers in converter I produce a relatively low percentage yield so that the gases striking the converter II$^a$ still contain a relatively considerable amount of unreacted gases. The catalyst layers in converter II$^a$ are thin and the period of time during which the gases are encountered with the catalyst at any one time is short which tends to prevent overheating in converter II$^a$. The gases passing out from this converter are reacted to a large extent and are then passed through a very deep catalyst layer in converter II$^b$ where the reaction is carried to completion.

The arrangement of a series of layer converters after a gas cooled converter can, of course, also be used in connection with gas cooled converters shown in the other figures and in many cases presents important advantages.

Fig. 11 illustrates the combination of two gas cooled converters I*a* and I*b* with a single layer converter II. The converter I*a* is of the highly effective, modified Tentelew type illustrated in Fig. 6, while the converter I*b* is similar to the type shown in Fig. 4, and is provided with a very deep catalyst layer. The pipe 121 connects the two converters I*a* and I*b*, while the pipe 21 connects converters I*b* and II which is an ordinary three layer converter having catalyst layers of increasing thickness in the direction of gas flow. This arrangement of catalysts permits enormous gas velocities in reactions which are very strongly exothermic. The amount of catalyst in proportion to the cooling surface in the converter I*a* is very small and despite violent reaction, there is no danger of overheating. In converter I*b*, the catalyst layer is much thicker and the gas cooling is much less efficient, since, of course, the gases themselves are hot. The final reaction takes place in the converter II where the layers become progressively deeper and deeper, permitting the last few percent of yield to be achieved.

The arrangement of the two gas cooled converter types shown, both of which are automatic, is an unusually effective one. Not only are the converters automatically cooled in proportion to the amount of gases flowing therethrough, but the system, as a whole, is to a considerable extent self balancing. Thus, for example, the increase of speed of gas flow in converter I*a* increases the cooling in that converter and decreases the percentage yield and, therefore, the exit temperature of the gases which then enter the converter I*b* at a lower temperature, at higher speed, and therefore, compensate for the increased heating effect in this latter converter due to the larger proportion of the reaction taking place therein. The automatic proportioning of cooling between the two converters is thereby effected and it is possible to enormously increase the yield per unit time and per unit of apparatus by greatly increasing the gas speed which would not be practicable if a single converter were used because it would result in too low a percentage yield. In the arrangement shown in Fig. 11, however, this decreased percentage yield is compensated by the increased amount of reaction taking place in the other two converters so that the system as a whole permits very high yields per hour without a reduction in the yield percentage and with a most satisfactory regulation of cooling.

Of course, other combinations of gas cooled converters can be used and Fig. 11 is intended only to illustrate two typical gas cooled converters, as thus, for example, one converter may be automatic and the other semi-automatic and the like. In general, it is desirable to place the most efficient, fully automatic converter as the first in the series, since the amount of heat evolved therein tends to be a maximum per pound of catalyst. The exact arrangement and proportioning with cooling efficiency will, of course, be determined in any particular case by the skilled mechanical engineer.

In Fig. 12 a liquid cooled converter I is combined with an ordinary layer type converter II. The liquid cooled converter is of conventional design, consisting in a shell 132, perforated partitions 122 and 123 connected by catalyst tubes 124. A bottom piece 125 and top piece 126 completes the converter structure. The space surrounding the tubes 124 between the partition 122 and 123 is filled with a suitable high boiling liquid which may be mercury or other low melting alloys or may be any suitable liquid under pressure. The liquid chamber is connected at its upper part with a radiator by the pipe 127. The radiator consists in a lower header 128, upper header 129 and radiating tubes 130, a suitable safety valve 131 being provided to prevent the excess pressures. The top piece 126 of the converter is connected to the layer converter II by a pipe 21 and the bottom piece 125 is connected to an inlet gas main.

In operation, the reaction gases pass in through the inlet main into the bottom piece 125, thence up through the catalyst tubes 124 into the top piece 126 and out through the pipe 21 into the converter II. The heat evolved in the tubes 124 is transmitted to the surrounding liquid which boils, the vapors ascending into the tubes 130 which are exposed to air or may, if desired, be water cooled. The vapors condense and the liquid flows back through the pipe 127. In this manner, by a suitable adjustment of the valve 131, the temperature can be maintained substantially constant and owing to the great heat absorbing capacity of the liquid, very high gas speeds are possible.

A suitable intercooler or heat exchanger may be inserted between the converter I and II as has been described in connection with some of the foregoing figures. If a heat exchanger is used, it may be connected to the inlet gas so as to warm up the latter where it is proved desirable. A second heat exchanger after the converter II may also be provided as is described in connection with Fig. 1 and some of the other figures.

The liquid cooled converter shown in Fig. 12 is purely diagrammatic and any other suitable type of liquid cooled converter may be used.

In Fig. 13, a combination of two different types of automatically gas cooled converters is shown associated with heat exchangers. The first converter provides for a two-phase liquid vapor temperature equalizing system, whereas the second converter is of the ordinary, automatic gas cooled type. The first converter is of the type shown in Fig. 6, but is provided with temperature equalizing tubes 140, which enter the tubes 170 through the stuffing boxes 141 and extend substantially the full distance of the catalyst. These tubes are partly filled with a liquid, preferably one which boils at about the temperature of the reaction such as for example mercury or low boiling metal alloys in the case of organic oxidations. Displacing bodies of high heat conductivity such as metal granules or fragments may be placed in the temperature equalizing tubes in order to diminish the quantity of liquid required. Heat evolved in the catalysts causes the liquid to boil and condense in the upper portion of the tubes above the partition 65 where a blast of air or other cooling gas enters through the pipe 143 provided with the valve 142 and passes out through the pipe opening 144 in the shell 147, which pipe is provided with a valve 145 connecting to an exhaust pipe 162. The cooling chamber is also provided with a top or ceiling 146 which may be attached to the shell section 147 by any suitable means. The rapid transfer of heat from the center of the catalyst which is normally the hottest as it is furthest removed from the cooling gases, brings about a very desirable even control of temperature which is particularly advantageous in reactions requiring a very delicate temperature control such as for example many oxidations of organic compounds. I do not in this application claim the new type of converter per se, this forming the subject-matter of my co-pending application, Serial No. 146,525, filed Nov. 5, 1926.

The bottom chamber of the converter is connected by the pipes 21 and 23 provided with the valve 24 to the heat exchanger III, which is of a design similar to that in Fig. 1, similar parts bearing the same numerals. A by-pass pipe 35 provided with a valve 22 permits by-passing more or less of the gases directly into the pipe 155 which connects the upper portion of the heat exchanger 31 to the upper portion 2 of converter II and is provided with valves 154 and 164, the former controlling the amount of gas flowing from the heat exchanger, the latter permitting the introduction of fresh cold gases.

Converter II is an ordinary automatically gas cooled type such as that shown in Fig. 1, except that no orifice plates are provided in order to equalize the gas flow. This converter is also provided with a flanged opening 157 for filling in catalyst. After passing through the gas cooled converter, the gases continue through the pipe 156 into the heat exchanger IV which is of the same design as that shown in Fig. 1. Incoming cold gases entering the heat exchanger IV through the pipe 45 are heated up by passage therethrough, then pass through the pipe 26 either directly into the shell of converter I or may be by-passed through the heat exchanger III by a suitable regulation of the valves 27 and 36 situated in the pipes 26 and 29 respectively. This circulation control is the same as that shown in Fig. 1. An additional inlet pipe 159 provided with a valve 158 and entering the pipe 26 can be used for the additional introduction of hot or cold gases, fresh or inert.

In some reactions, it may be desirable to maintain the gas at a high temperature, but at the same time to slow down the reaction in converter I. This can be effected by recirculating a certain amount of the reacted gases by means of the blower 148 through the pipe 149 into the pipe 26. Additional gases, either fresh or inert, can be introduced through the pipe 149 through the pipes 160 and 161 which unite to form the pipe 150. Suitable valves 151, 152 and 153 control the flow in these pipes.

It is, therefore, possible to adjust the temperature of reaction in the two converters with great accuracy and to maintain an exceedingly even temperature particularly in converter I whereby by far the greatest proportion of the reaction takes place. This renders the arrangement particularly suitable for such delicate reactions as the vapor phase oxidation of naphthalene to alpha-naphthaquinone and phthalic anhydride and other sensitive organic oxidations.

Fig. 14 illustrates a similar combination of two automatically gas cooled converters, the first being provided with temperature equalizing tubes 140. This converter I is illustrated with a provision for direct introduction of cold reaction gases into the catalyst. The heat equalizing tubes 140, instead of passing through stuffing boxes in the partition 65, pass through openings. In addition to the circulation of gases from the pipe 26 which is the same as in the foregoing figures, cold or warmed reaction gases entering through the valved pipe 142 into the upper chamber of the converter are diffused by the baffles 165 and pass downward directly over the catalysts. The control of the amount of gases may be either manual or automatic for example thermostatic. The gases may be heated up nearly to reaction temperature or may be kept quite cool. In any event, they are somewhat heated up by passing over the upper ends of the heat equalizing tubes where the condensing vapors of the boiling liquid serve to convey to the incoming gases a considerable amount of heat. The heat equalizing tubes are illustrated as of different lengths in order to bring about additional heat absorption in the various tubes so as to equalize the heat evolved. It should be noted that the heat equalizing tubes 140 do not extend quite down to the lower partition 165 of the converters I in order to prevent the catalyst at this point from becoming excessively cooled.

Converter II is of the inverted gas cooled type such as has been shown for example in Fig. 11 and requires no further description. Instead of the heat exchanger III, an intercooler of the design shown in Fig. 2 is provided, similar parts bearing the same reference characters. In general, heat exchangers and intercoolers can be used in the arrangement of the present invention wherever suitable and the choice of the particular device to be used will be determined by the conditions under which the installation is to operate.

The installations shown in the different figures are applicable to a wide number of different catalytic reactions, the particular modification, structural design and dimensioning of the converters varying, of course, with the conditions under which they are to operate. Without in any sense limiting the field of utility of the invention, it may be noted that the combinations shown in Figs. 1 to 10 are very satisfactory for reactions in which the end product is relatively stable against further catalytic reactions. Thus, for example, these types of apparatus may be satisfactorily used in catalytic reductions, dehydrations, hydrogenations, dehydrogenations, oxidation, condensations and similar reactions. They may also be used for combined reactions, for high pressure reactions, and for certain special reactions such as the catalytic purification of gases, catalytic removal of poisons, catalytic watergas process, the synthesis of ammonia, the synthesis of hydrocyanic acid and the production of reduction products of oxides of carbon, such as for example, methanol, various motor fuels and the like.

Among the many reactions for which the apparatus is suitable are the reduction of nitro compounds to the corresponding amines, such as for example, the reduction of nitro benzol, nitro toluol, nitro phenol, nitro naphthalene, and the like, the production of camphor from borneol, the reduction of phenol to cyclohexanol and naphthalene to tetraline, etc., croton aldehyde to normal butyl alcohol acetaldehyde to ethyl alcohol etc.

Many oxidation reactions are advantageously carried out in the apparatus shown in Figs. 1 to 10, notably the catalytic oxidation of sulfur dioxide to sulfur trioxide, the catalytic oxidation of ammonia to oxides of nitrogen, watergas processes, the purification of coal tar ammonia, by catalytic oxidation processes, etc.

While the apparatus can be very satisfactorily used for high pressure catalyses such as the synthesis of methyl alcohol and motor fuels as well as the synthesis of ammonia, I have found that it is a particular advantage of the present invention that some of these reactions, such as for example, the production of motor fuel or methanol may also be carried out at ordinary pressures as the invention permits the accurate thermal control of the reaction.

The combination shown in Figs. 11 to 14 and particularly 13 and 14 constitute converter combinations which are remarkably fitted for very sensitive catalytic reactions such as for example the strongly exothermic oxidation of organic compounds, as for example, the catalytic oxidation of naphthalene to alphanaphthaquinone and phthalic anhydride, toluol, chlor toluols, and nitro toluols and similar derivatives to the corresponding aldehydes and acids, xylenes, mesitylenes, pseudocumenes, paracumenes, etc., to the corresponding aldehydes and acids, production of vanillin and vanillic acid from isoeugenol, the oxidation of methyl alcohol to formaldehyde, ethylenechlorhydrine to chloracetic acid, acenaphthene to naphthalic anhydride, etc.

It should be understood that many of the catalytic reactions referred to above and particularly reductions and hydrogenations may and frequently should be carried out by processes in which a more or less continuous circulation is used. The converter systems illustrated in the various figures may be easily and simply adapted to circulating processes as will be apparent to the skilled chemical engineer and it will be understood that the present invention can be used in circulation or semi-circulation processes of the most diverse character.

In the claims the expression "intercooling means" is used as a generic expression for intercoolers and for heat exchangers, and includes either of these structures.

Having thus described my invention, what I desire to secure by Letters Patent of the United States and claim is:

1. Catalytic apparatus comprising in combination at least one automatic gas cooled converter containing a catalytic chamber, a catalyst layer therein, heat exchanging elements at least partially embedded in the catalyst layer, means for causing reaction gases to circulate through the heat exchanging elements out of direct heat exchanging relation with the catalyst, means for causing the gases to reverse their flow in the heat exchanging elements and to pass in reverse flow through portions of the elements in direct heat exchanging contact with the catalyst, means for deflecting gases issuing from the heat exchanging elements through the catalyst, at least one converter of lower heat-dissipating capacity, and means for causing the reaction gases to pass in series first through the automatic gas-cooled converters and then through the converters of lower heat-dissipating capacity.

2. Catalytic apparatus comprising in combination at least one automatic gas cooled converter containing a catalytic chamber, catalyst therein, a gas permeable bottom supporting said catalyst, a gas impermeable partition above the catalyst layer, upright tubes having closed bottoms, at least a portion of the tubes being embedded in the catalyst and the open end being below the gas impermeable upper partition, open ended tubes passing downwardly through the upper partition into the closed end tubes and extending for a substantial distance therein below the level of the catalyst layer, means for causing reaction gases to pass downwardly through the open ended tubes, upwardly through the closed ended tubes, and then downwardly through the catalyst layer, at least one converter of lower heat-dissipating capacity, and means for causing the reaction gases to pass in series first through the automatic gas-cooled converters and then through the converters of lower heat-dissipating capacity.

3. In a converter system the improvement which comprises in combination at least one converter provided with a catalyst and with cooling means sufficient to permit it to operate at loadings largely in excess of normal for commercial yields, at least one converter of much less effective cooling capacity, and connections between the outlet of the powerfully cooled converters and the inlet of the converters of lower cooling capacity.

4. In a converter system the improvement which comprises in combination at least one converter provided with a catalyst and with cooling means sufficient to permit it to operate at loadings largely in excess of normal for commercial yields, at least one converter of much less effective cooling capacity and connections between the outlet of the powerful cooled converters and the inlet of the converter of lower cooling capacity, said connections including intercooling means.

5. In a converter system the improvement which comprises in combination at least one converter provided with a catalyst and with cooling means sufficient to permit it to operate at loadings largely in excess of normal for commercial yields, at least one converter of much less effective cooling capacity and connections between the outlet of the powerfully cooled converters and the inlet of the converters of lower cooling capacity, said connections including heat exchanging means.

6. In a converter system the improvement which comprises in combination at least one converter provided with a catalyst and with cooling means, which cooling means provide a cooling effect which increases rapidly with increase in reaction gas velocity through the converter and which cooling means are sufficient to permit the converters to operate at loadings largely in excess of normal for commercial yields, at least one converter of much less effective cooling capacity, and connections between the outlet of the powerful cooled converters and the inlet of the converters of lower cooling capacity.

7. In a converter system the improvement which comprises in combination at least one converter provided with a catalyst and with cooling means which provide a cooling effect increasing substantially in proportion to the reaction gas velocity through the converter, said cooling means being of sufficient capacity to permit the converter to operate at loadings largely in excess of normal for commercial yields, at least one converter of much less effective cooling capacity, and connections between the outlet of the powerfully cooled converters and the inlet of the converters of lower cooling capacity.

8. In a converter system the improvement which comprises in combination at least one converter provided with a catalyst and with cooling means, which cooling means provide a cooling effect which increases rapidly with increase in reaction gas velocity through the converter and which cooling means are sufficient to permit the converters to operate at loadings largely in excess of normal for commercial yields, at least one converter of much less effective cooling capacity, and connections between the outlet of the powerfully cooled converters and the inlet of the converters of lower cooling capacity, said connections including intercooling means.

9. In a converter system the improvement which comprises in combination at least one converter provided with a catalyst and with cooling means which provide a cooling effect increasing substantially in proportion to the reaction gas velocity through the converter, said cooling means being of sufficient capacity to permit the converter to operate at loadings largely in excess of normal for commercial yields, at least one converter of much less effective cooling capacity, and connections between the outlet of the powerfully cooled converters and the inlet of the converters of lower cooling capacity, said connections including intercooling means.

10. In a converter system the improvement which comprises in combination a plurality of converters arranged in series provided with catalysts and with cooling means sufficient to permit them to operate at loadings largely in excess of normal for commercial yields, at least one converter of much less effective cooling capacity, and connections between the outlet of the powerfully cooled converters and the inlet of the converters of lower cooling capacity.

11. In a converter system the improvement which comprises in combination a plurality of converters in series provided with catalysts and with cooling means decreasing in capacity in the series, but always of capacity sufficient to operate the respective converters at loadings largely in excess of normal for commercial yields, at least one converter of much less effective cooling capacity, and connections between the outlet of the powerfully cooled converters and the inlet of the converters of lower cooling capacity.

12. In a converter system the improvement which comprises in combination at least one converter provided with a catalyst and with cooling means sufficient to permit it to operate at loadings largely in excess of normal for commercial yields, a plurality of converters of much less effective cooling capacities arranged in series, and connections between the outlet of the powerfully cooled converters and the inlet of the first converter of lower cooling capacity.

13. In a converter system the improvement which comprises in combination at least one converter provided with a catalyst and with cooling means sufficient to permit it to operate at loadings largely in excess of normal for commercial yields, a plurality of converters of much less effective cooling capacities arranged in series in the order of descending cooling capacity and connections between the outlet of the powerful cooled converters and the inlet of the first of the series of converters of lower cooling capacities.

Signed at Pittsburgh, Pennsylvania, this 17th day of January, 1927.

ALPHONS O. JAEGER.

mercial yields, at least one converter of much less effective cooling capacity, and connections between the outlet of the powerfully cooled converters and the inlet of the converters of lower cooling capacity.

11. In a converter system the improvement which comprises in combination a plurality of converters in series provided with catalysts and with cooling means decreasing in capacity in the series, but always of capacity sufficient to operate the respective converters at loadings largely in excess of normal for commercial yields, at least one converter of much less effective cooling capacity, and connections between the outlet of the powerfully cooled converters and the inlet of the converters of lower cooling capacity.

12. In a converter system the improvement which comprises in combination at least one converter provided with a catalyst and with cooling means sufficient to permit it to operate at loadings largely in excess of normal for commercial yields, a plurality of converters of much less effective cooling capacities arranged in series, and connections between the outlet of the powerfully cooled converters and the inlet of the first converter of lower cooling capacity.

13. In a converter system the improvement which comprises in combination at least one converter provided with a catalyst and with cooling means sufficient to permit it to operate at loadings largely in excess of normal for commercial yields, a plurality of converters of much less effective cooling capacities arranged in series in the order of descending cooling capacity and connections between the outlet of the powerful cooled converters and the inlet of the first of the series of converters of lower cooling capacities.

Signed at Pittsburgh, Pennsylvania, this 17th day of January, 1927.

ALPHONS O. JAEGER.

DISCLAIMER.

1,660,511.—*Alphons O. Jaeger*, Crafton, Pa. CATALYTIC APPARATUS. Patent dated February 28, 1928. Disclaimer filed February 21, 1929, by the assignee, *The Selden Company.*

Therefore, enters this disclaimer to the converter system of claim 3, or of claim 4, or of claim 5, except when said system is operated in the manner set forth in lines 75 to 88 inclusive of page 1 of the patent specification.

[*Official Gazette March 12, 1929.*]

DISCLAIMER.

1,660,511.—*Alphons O. Jaeger*, Crafton, Pa. CATALYTIC APPARATUS. Patent dated February 28, 1928. Disclaimer filed February 21, 1929, by the assignee, *The Selden Company*.

Therefore, enters this disclaimer to the converter system of claim 3, or of claim 4, or of claim 5, except when said system is operated in the manner set forth in lines 75 to 88 inclusive of page 1 of the patent specification.

[*Official Gazette March 12, 1929.*]